United States Patent [19]

Takahashi

[11] Patent Number: 4,730,850
[45] Date of Patent: Mar. 15, 1988

[54] QUICK RELEASE COUPLING DEVICE

[75] Inventor: Susumu Takahashi, Koshijimachi, Japan

[73] Assignee: Niigata Engineering Co., Ltd., Tokyo, Japan

[21] Appl. No.: 860,666

[22] Filed: May 7, 1986

[30] Foreign Application Priority Data

May 11, 1985 [JP] Japan .............................. 60-69789[U]
Jul. 18, 1985 [JP] Japan .............................. 60-158758
Mar. 19, 1986 [JP] Japan .............................. 61-61355

[51] Int. Cl.⁴ ............................................. F16L 23/00
[52] U.S. Cl. ........................................ 285/3; 285/18; 285/365; 285/409
[58] Field of Search ................ 285/18, 365, 366, 409, 285/411, 407, 1, 3

[56] References Cited

U.S. PATENT DOCUMENTS

| 4,106,799 | 8/1978 | Oetiker | 285/365 |
| 4,202,568 | 5/1980 | Strom | 285/365 X |
| 4,306,739 | 12/1981 | Bormioli | 285/18 |
| 4,309,049 | 1/1982 | Chevallier | 285/18 |
| 4,354,522 | 10/1982 | Bormioli | 285/1 X |
| 4,488,744 | 12/1984 | Bubeck et al. | 285/411 X |

FOREIGN PATENT DOCUMENTS

| 111652 | 9/1968 | Denmark | 285/365 |
| 175469 | 3/1986 | European Pat. Off. | 285/1 |
| 3048903 | 7/1982 | Fed. Rep. of Germany . | |
| 1472750 | 5/1977 | United Kingdom | 285/409 |

Primary Examiner—Thomas F. Callaghan
Attorney, Agent, or Firm—Scully, Scott, Murphy & Pressor

[57] ABSTRACT

A quick release coupling device for securing end flanges of two adjacent pipes includes a clamp assembly. The clamp assembly has a plurality of clamping members disposed to straddle the two end flanges therearound so as to generally circumscribes the two end flanges. Each clamping member either has a spring or is of spring nature for resiliently urging the clamping member radially outwardly of the end flanges. The clamp assembly also has a plurality of connecting members for connecting respective adjacent pairs of clamping members so as to form an annulus provided a gap between two end clamping members. Coupling means is disposed in the gap for releasably connecting one end clamping member and the other end clamping member against the bias of the clamping members so as to complete the annulus.

12 Claims, 16 Drawing Figures

QUICK RELEASE COUPLING DEVICE

BACKGROUND OF THE INVENTION

1. Field of the Invention

The present invention pertains to a quick release coupling device mainly for use in a marine loading arm installation which is particularly designed to transfer very low temperature fluid products such as liquefied natural gases.

2. Prior Art

A marine loading arm installation is conventionally employed for unloading petroleum products from a tank vessel to a storage tank on land or for loading the same from the storage tank to the tank vessel. The loading arm installation includes an assembly of articulated pipe sections carrying a flanged end connector and is mounted on a sea berth for bolted connection of the end connector to a similar flanged connector on the manifold of the tank vessel. During the transfer of the fluid cargo, the vessel moves due to wind, tide or wave, and the level of the deck thereof changes. Then, the pivotal arms of the loading arm installation can move following the movement of the vessel. However, an excessive movement of the vessel may cause the intervening space between the vessel and the sea berth to exceed the safety reach of the loading arm. In such a case, since the bolted connection of the loading arm to the manifold is unyielding, one of the pipe sections or other parts of the loading arm will break. Consequently, in the conventional loading arm, in order to prevent the breakage and a serious hazard in that case, a quick release coupling device is provided for the flanged pipe connections of the loading arm and the manifold of the tank vessel.

A prior art quick release coupling device includes a plurality of clamping members disposed to straddle the end flanges of two pipes to be coupled, a plurality of connecting rods hinged at their ends to respective pairs of clamping members so as to form an articulated succession of the clamping members, the clamping members and the connecting rods being disposed about the end flanges in the form of a ring provided with a gap between two end clamping members thereof, and connecting means for releasably coupling the two end clamping members to complete the ring. In the coupling device of this type, the connecting means works to release the two end clamping members and hence the plurality of the clamping members from the end flanges in case of emergency.

However, when very low temperature fluid cargo such as liquefied natural gas is transferred through the loading arm installation, a layer of ice forms on the outside of the quick release device. In such a case, even though the connecting means might work in emergency, it is possible that the ice formed on the clamping members prevents them from being released from the end flanges and uncoupling of the loading arm cannot be effected.

SUMMARY OF THE INVENTION

It is therefore the object of the present invention to provide a quick release coupling device for securing together the end flanges of two pipes which device operates to reliably release the pipes even in the presence of ice formed thereon when an emergency arises.

According to the present invention, there is provided a quick release coupling device for securing end flanges of two pipes together comprising a clamp assembly including a plurality of clamping members disposed to straddle the two end flanges therearound in circumferentially distributed relation so as to generally circumscribe the two end flanges, each clamping member having urging means for resiliently urging the clamping member radially outwardly of the end flanges, and a plurality of connecting members together for connecting respective adjacent pairs of clamping members so as to form an annulus provided with a gap between two end clamping members, and coupling means disposed in the gap for releasably connecting one end clamping member of the clamp assembly and the other end clamping member thereof together against the bias of the urging means of the clamping members so as to complete the annulus.

BRIEF DESCRIPTION OF THE DRAWINGS

While the specification concludes with claims which particularly point out and distinctly define the subject matter which is regarded as the invention, it is believed that the invention will be more clearly understood from the following detailed description and the accompanying figures of the drawings, in which the same or similar members are designated by the same reference numerals.

In the drawings.

DESCRIPTION OF PREFERRED EMBODIMENT OF THE INVENTION

Referring to FIGS. 1 to 8, there is illustrated one embodiment of a quick release coupling device in accordance with the present invention, in which reference numerals 10 and 12 indicate a pair of couplings which are secured to the ends of a pair of pipes 14 and 16, respectively. Each of the couplings 10 and 12 includes a connecting flange 18, 20 at one end thereof and a radial end flange 22, 24 at the opposite end thereof, the connecting flange 18, 20 being coupled to a flange 26, 28 of the end of the pipe 14, 16 by bolts (not shown). The couplings 10 and 12 are connected together by the quick release coupling device, with the end flanges 22 and 24 being confronted with each other. The end flanges 22 and 24 have forward end faces 30 and 32 held in contact with each other to form a radial sealing interface therebetween, circumferential surfaces 34 and 36, and rearward surfaces 38 and 40 tapering toward the connecting flanges 18 and 20 and extending rearwardly from the circumferential surfaces 34 and 36, respectively.

Figure 1:
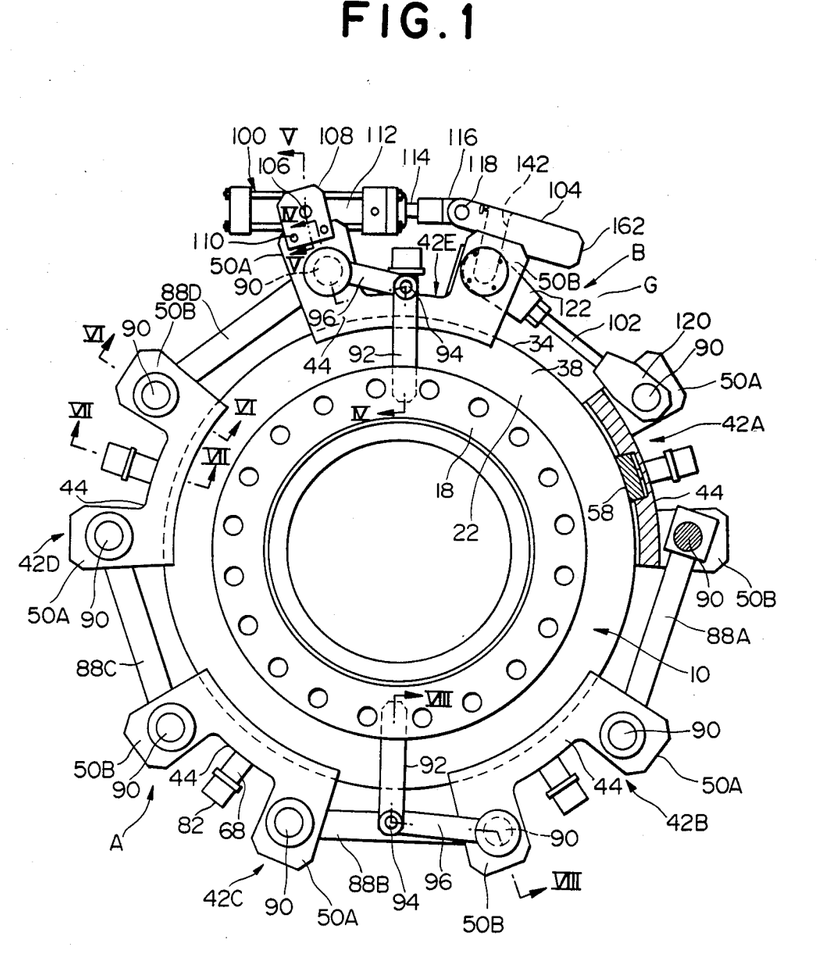
FIG. 1 is a partial cutaway front-elevational view of a first embodiment of a quick release coupling device in accordance with the present invention.
Figure 2:
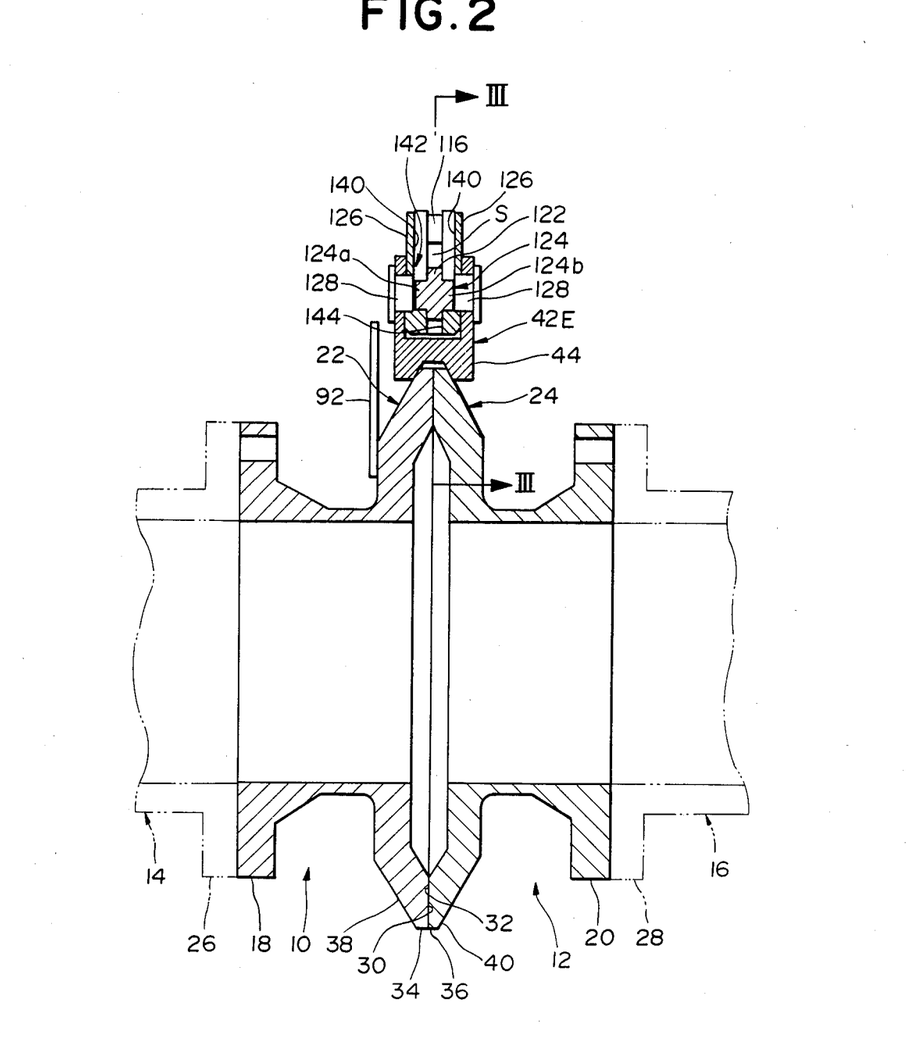
FIG. 2 is a sectional view showing couplings, coupling means and the like of the quick release coupling device.
Figure 3:
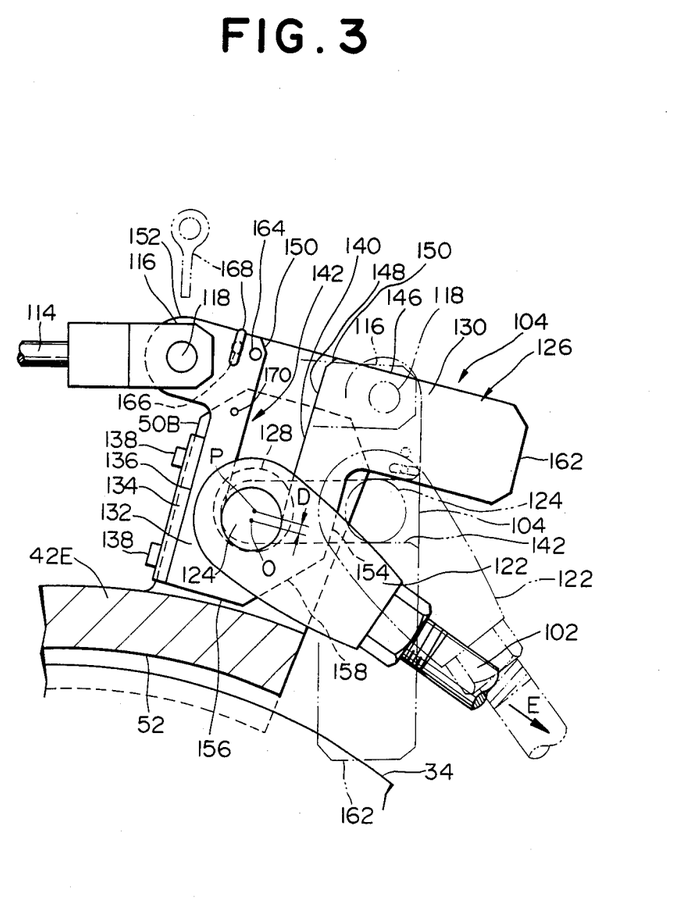
FIG. 3 is a sectional view taken along the line III—III of FIG. 2.
Figure 4:
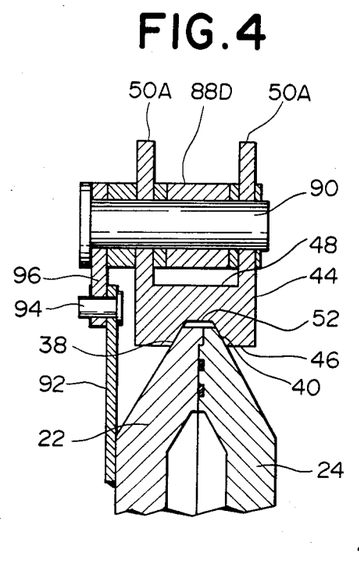
FIG. 4 is a sectional view taken along the line IV—IV of FIG. 1.
Figure 5:
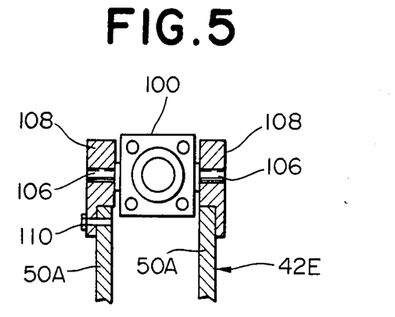
FIG. 5 is a sectional view taken along the line V—V of FIG. 1.
Figure 6:
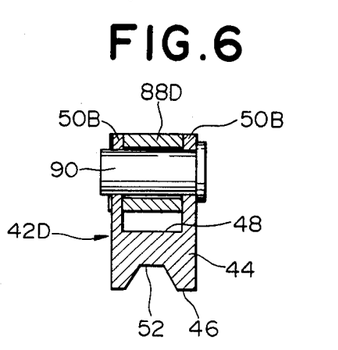
FIG. 6 is a sectional view taken along the line VI—VI of FIG. 1.
Figure 7:
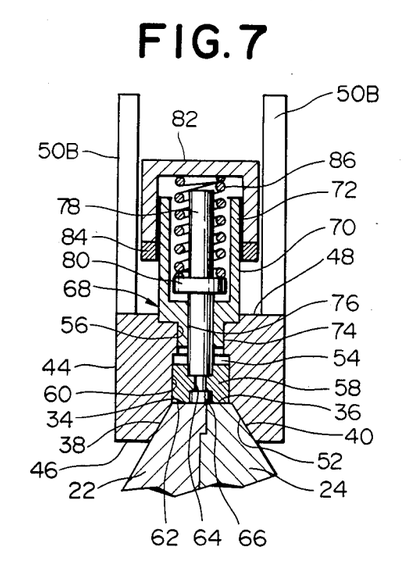
FIG. 7 is a sectional view taken along the line VII—VII of FIG. 1.
Figure 8:
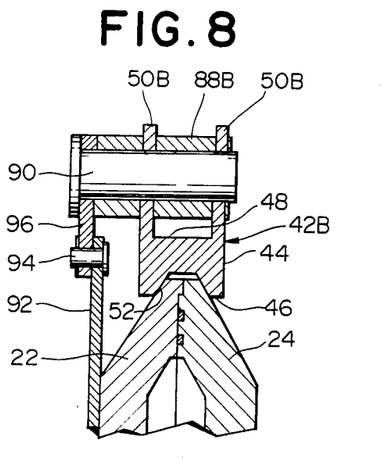
FIG. 8 is a sectional view taken along the line VIII—VIII of FIG. 1.

The quick release coupling device generally includes a clamp assembly A and coupling means B. The clamp assembly A includes a plurality of clamping members 42A to 42E disposed around the end flanges 22 and 24 of the couplings 10 and 12 in circumferentially spaced relation to each other. Each of the clamping members 42A to 42E includes an elongated arcuate plate 44 having arcuate inner and outer surfaces 46 and 48, and two pairs of opposed standards 50A and 50B integrally mounted on and outwardly projecting from the outer surface 48 of the arcuate plate 44 at opposite ends thereof, respectively, each pair of opposed standards 50A, 50B being disposed on the lateral marginal portions of the outer surface 48. An arcuate groove 52 of a trapezoidal cross-section is formed in the inner surface 46 of the arcuate plate 44 and extends along the inner surface 46 thereof so that the arcuate plate 44 is fitted on the outer periphery of the end flanges 22 and 24 of the couplings 10 and 12 with the inclined side walls of the groove 52 being held in contact with the tapered rearward surfaces 38 and 40 thereof, respectively. Consequently, when the clamping members 42A to 42E are disposed around the end flanges 22 and 24, each of the clamping members 42A to 42E straddles the end flanges 22 and 24 and is held in firm engagement therewith.

Each of the clamping members 42A to 42E also includes an arcuate recess 54 of a square cross-section and a bore 56 of a circular cross-section both of which are formed in the arcuate plate 44. The recess 54 has a width generally equivalent to the sum width of the circumferential surfaces 34 and 36 of the end flanges 22 and 24 and extends along the groove 52 with appropriate length and depth. The bore 56 extends from the outer surface 48 toward the inner surface 46, and has an upper portion adjacent the outer surface 48 and a lower portion adjacent the recess 54, the lower portion having a smaller diameter than that of the upper portion. Thus, the bore 56 and the groove 52 are communicated with each other through the recess 54 disposed therebetween. Housed in the recess 54 of the arcuate plate 44 is a pressing plate 58 which has a thickness smaller than the depth of the recess 54 and is slidable along the recess walls 60. The pressing plate 58 has an arcuate inner surface 62 which is brought into contact with the circumferential surfaces 34 and 36 of the end flanges 22 and 24 when the clamping members 42A to 42E are disposed around them. The pressing plate 58 also has a small bore 64 formed therethrough to accommodate a hexagon socket head cap screw 66. A cylindrical housing 68, which includes a tubular portion 70 having an exteriorly threaded upper portion 72 adjacent its open top end and a hub portion 74 formed on the bottom end of the tubular portion 70 in coaxial relation thereto, is fixedly secured to the arcuate plate 44, with the hub portion 74 and the bottom end of the tubular portion 70 firmly received in the lower portion and the upper portion of the bore 56, respectively. The housing 68 also includes a bore 76 extending through the bottom end of the tubular portion 70 and the hub portion 74 coaxially therewith. A pushing rod 78 of a circular cross-section is received in the tubular portion 70 of the housing 68. The pushing rod 78 includes a radial flange ring 80 mounted integrally around the peripheral surface thereof intermediate opposite ends thereof, the flange ring 80 being received in the tubular portion 70 of the housing 68 for sliding movement therealong. The pushing rod 78 extends outwardly through the bore 76 of the bottom end of the tubular portion 70 and the hub portion 74 into the recess 54 of the arcuate plate 44. The pressing plate 58 is fixedly secured to the inner end of the pushing rod 78 by the screw 66. An interiorly threaded cap 82 is threaded onto the upper portion 72 of the tubular portion 70 of the housing 68 and firmly secured thereto by a locking nut 84 threaded on the upper portion 72. A compression coil spring 86 is wound around the pushing rod 78 and acts between the radial flange ring 80 thereof and the inner end face of the cap 82 to urge the pushing rod 78 toward the circumferential surfaces 34 and 36 of the end flanges 22 and 24 to hold the pressing plate 58 against them when the clamping members 42A to 42E are disposed around the end flanges 22 and 24. The urging force of the coil spring 86 can be suitably adjusted by moving the cap 82 along the threaded upper portion 72 of the housing 68.

The plurality of the clamping members 42A to 42E disposed around the end flanges 22 and 24 are connected to each other by a plurality of connecting rods 88A to 88D so as to form an articulated succession in the form of an annulus with a gap G between two end clamping members 42A and 42E. Each pair of opposed standards 50A, 50B of the clamping members 42A to 42E except for the pair of end standards 50B of the end clamping member 42E, journals a shaft 90. Each of the connecting rods 88A to 88D has one end pivotally connected to the shaft 90 journalled by the standards 50A of each of the clamping members 42B to 42E and the opposite end to the shaft 90 journalled by the standards 50B of each of the clamping members 42A to 42D. A pair of mounting flat bars 92 are welded at their one ends to a rear face of the end flange 22 in diametrically opposite relation. Pivotally connected to the flat bars 92 by pins 94 at the free ends thereof are a pair of links 96 which are pivotally connected further to the shafts 90 journalled by the standards 50A of the end clamping member 42E and the standards 50B of the clamping member 42B, respectively. Thus, the plurality of the clamping members 42A to 42E and the connecting rods 88A to 88D are supported by the flat bars 92 and the links 96 on the end flange 22 of the coupling 10 in such a manner that the clamping members 42A to 42E are retained in place around the end flange 22 even when the clamp assembly A is in a released condition to be hereinafter explained.

Provided in the gap G between the two end clamping members 42A and 42E is the coupling means B which releasably couple them. The coupling means B includes drive means 100 in the form of a hydraulic cylinder, a coupling rod 102 and a rocker lever 104. The hydraulic cylinder 100 is pivotally connected to trunnions 106 extending, respectively, from a pair of opposed mounting ears 108 which are secured on the pair of standards 50A of the end clamping member 42E by bolts 110. The hydraulic cylinder 100 has a piston, not shown, slidably received in its cylinder body 112 and has a piston rod 114 connected to the piston and extending from the cylinder body 112. The piston rod 114 has a clevis 116 at the outer end which receives therein a clevis pin 118. The coupling rod 102 includes a pair of block 120 and 122 respectively mounted thereon at opposite ends thereof, the block 120 being pivotally mounted on the shaft 90 journalled by the pair of standards 50A of the end clamping member 42A. The block 122 at the free end of the coupling rod 102 has a pair of integral stubs 124a and 124b at opposite sides thereof, the pair of stubs 124a and 124b extending along the common axis of the end flanges 22 and 24 and constituting an engagement shaft 124. The rocker lever 104 includes a pair of parallel opposed rocker plates 126 which are pivotally connected to a pair of stub shafts 128 secured to the pair of standards 50B of the end clamping member 42E, respectively. Each of the rocker plates 126 has an elongated upper portion 130 and a generally square lower portion 132, and an end plate 134 is secured to both rear end faces 136 of the lower portions 132 of the rocker plates 126 by mounting screws 138 so as to connect the pair of rocker plates 126 together to define a space S therebetween. A pair of opposed slots 140, which constitute an engagement groove 142, are formed in the inner surfaces 144 of the rocker plates 126, respectively. Each slot 140 extends generally from a center of the lower portion 132, where each stub shaft 128 is mounted, toward upper end face 146 of the upper portion 130 and opens to the upper end face 146. Each slot 140 has a width slightly larger than a diameter of each stub 124a, 124b of the block 122 of the coupling rod 102 so that each stub 124a, 124b is received in each slot 140 for sliding movement therealong, the block 122 being disposed in the space S between the pair of rocker plates 126. Those corners defined by the upper end face 146 of the upper portion 130 of the rocker plates 122 and inner opposed side walls 148 of the slots 140 are removed to provide chamfered corners 150 to facilitate the introduction of the stubs 124a and 124b into the slots 140 and the release of them therefrom. Both rear ends 152 of the upper portion 130 of the rocker plates 126 are pivotally connected to the clevis pin 118. Those corner portions of the lower portions 132 of the rocker plates 126 defined by front and inner end faces 154 and 156 thereof are truncated to provide truncated corners 158 so as to clear the end portion of the outer surface 48 of the arcuate plate 44 of the end clamping member 42E, and thereby to permit the pivotal movement of the rocker lever 104 about the stub shafts 128. Both front end faces of the upper portions 130 of the rocker plates 126 serve as abutment means or surfaces 162 which are brought into abutment with the outer periphery of the end flanges 22 and 24 when the rocker plates 126 are pivoted, as shown in a two dots-and-dash line in FIG. 3. Two pairs of aligned bores 164 and 166 for selectively receiving a set pin 168 is formed through the pair of rocker plates 126 adjacent the rear chamfered corners 150, the bores 164 being closer to the slots 140 than the bores 166. Bores for receiving a shear pin 170 are also formed through the pair of rocker plates 126 and the pair of standards 50B of the end clamping member 42E, respectively, and are brought into alignment with each other when the rocker lever 104 is in a closed position to be hereinafter explained.

When the piston rod 114 of the hydraulic cylinder 100 is, as shown in FIG. 1, in a retracted position, the coupling means B is in the closed position corresponding to a coupled condition of the clamp assembly A in which the clamping members 42A to 42E are disposed around the two end flanges 22 and 24 to straddle them and the two end clamping members 42A and 42E are connected together. In the closed position, the rocker lever 104 is in such a position that the groove 142 is open and extending generally radially outwardly of the end flanges 22 and 24, and the engagement shaft 124 of the block 122 of the coupling rod 102 is received in the inner end of the groove 142. In the embodiment, the axis O of the engagement shaft 124 of the block 122 lies closer to the end flanges 22 and 24 than the common axis P of the stub shafts 128 supporting the rocker lever 104 in the closed position, where the distance D between the axes O and P is preferably selected to be, for example, 3 mm. Therefore, it will be noted that the force acting on the coupling rod 102 axially thereof toward the end clamping member 42A, as designated by an arrow E in FIG. 3, will cause the rocker lever 104 to pivot counterclockwise in FIG. 3 about the stub shafts 128 to firmly retain the engagement shaft 124 in the inner end of the groove 142, so that the block 122 is biased toward the end flanges 22 and 24 in the closed position. Also in the closed position, the set pin 168 is received in the bores 166 remote from the engagement groove 142 so as to permit the release of the block 122 from the space S, and the shear pin 170 is received in the bores to prevent accidental pivotal movement of the rocker lever 104.

In this condition, if an emergency arises, the hydraulic cylinder 100 is actuated so that the piston rod 114 thereof is extended. Then, the shear pin 170 is broken, and the rocker lever 104 is pivoted clockwise in FIG. 3 about the stub shafts 128. As the rocker lever 104 pivots clockwise, the engagement groove 142 thereof is caused to be inclined toward the end clamping member 42A, and the engagement shaft 124 of the block 122 which have been received in the inner end of the engagement groove 142 is caused to move along the engagement groove 142 outwardly thereof. As the rocker lever 104 further pivots, the abutment surfaces 162 thereof are brought into abutment, as shown in the two dots-and-dash line in FIG. 3, with the outer periphery of the end flanges 22 and 24, and the rocker lever 104 is still further pivoted into the open position about the abutting portion of the outer periphery thereof. As a result, the engagement shaft 124 is released from the groove 142, so that the two end clamping members 42A and 42E are decoupled and the clamp assembly A turns to be in the released condition where the clamping members 42A to 42E are supported by the links 96 and the flat bars 92 on the end flange 22 and are disengaged therefrom. In the release operation mentioned above, the reaction force due to the abutment of the abutment surfaces 162 with the end flanges 22 and 24 facilitate the release of the clamping members 42A to 42E from the end flanges 22 and 24. In addition, the compression coil springs 86 mounted in the clamping members 42A to 42E press the pressing plates 58 against the circumferential surfaces 34 and 36 of the end flanges 22 and 24 to facilitate the release of the clamping members 42A to 42E therefrom. Consequently, even in the presence of a layer of ice formed on the coupling device and the couplings 10 and 12 of the pipes 14 and 16, the coupling device reliably works to release the couplings 10 and 12 of the two pipes 14 and 16 to prevent a serious hazard.

For effecting the coupling operation of the coupling device, the clamping members 42A to 42E are disposed to straddle the end flanges 22 and 24 therearound, and the rocker lever 104 is first pivoted in such a manner that the engagement groove 142 thereof extends generally along the circumferential surfaces 34 and 36 of the end flanges 22 and 24 and opens toward the end clamping member 42A. Then, the engagement shaft 124 of the block 122 of the coupling rod 102 is received in the engagement groove 142, following which the set pin 168 is inserted in the bores 164 adjacent the groove 142 to prevent the movement of the block 122 from the space S and hence the release of the engagement shaft 124 from the groove 142. After that operation, the hydraulic cylinder 100 is actuated so that the piston rod 114 is retracted. As a result, the rocker lever 104 is pivoted so that the engagement groove 142 extends radially outwardly of the end flanges 22 and 24, and the engagement shaft 124 of the block 122 is moved along the engagement groove 142 and positioned in the inner end thereof. Lastly, the shear pin 170 is inserted in the bores, and the set pin 168 is retracted from the bores 164 adjacent the groove 142 and is inserted in the other bores 166 remote from the groove 142 to permit the movement of the block 122 from the space S.

Figure 9:
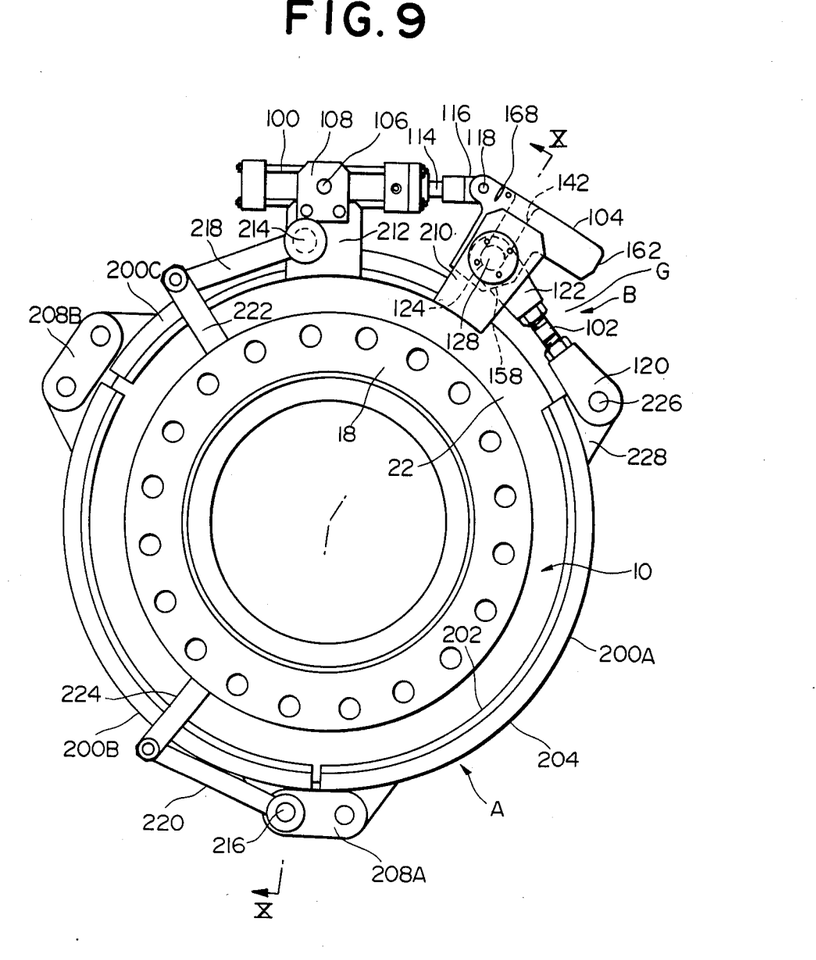
FIG. 9 is a front-elevational view showing a second embodiment of the quick release coupling device of the present invention.
Figure 10:
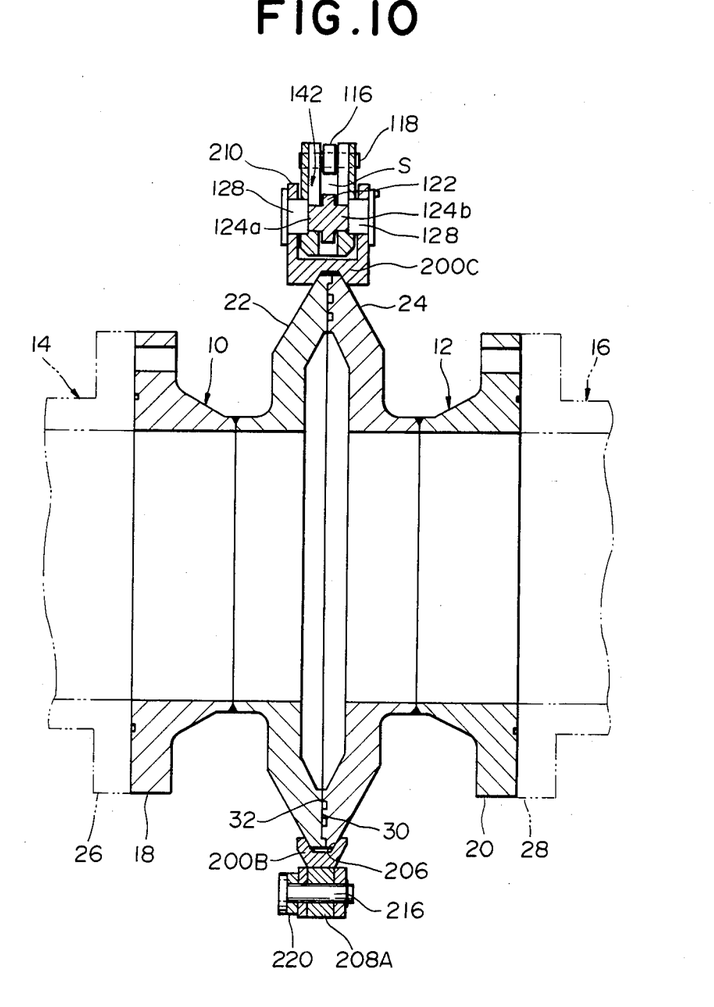
FIG. 10 is a sectional view taken along the line X—X of FIG. 9.

FIGS. 9 to 13 show a second embodiment of the coupling device in accordance with the present invention. In this embodiment, the plurality of clamping members comprise a plurality of arcuate spring plates 200A to 200C disposed to straddle the end flanges 22 and 24 therearound in circumferentially distributed relation so as to generally circumscribe the end flanges 22 and 24. Each of the spring plates 200A to 200C has a radius of curvature larger than a radius of the outer peripheral surface of each end flange 22, 24 in the released condition of the clamp assembly A, and is flexed to circumscribe the end flanges 22 and 24, as shown in FIG. 9 in the coupled condition of the clamp assembly A. Each of the spring plates 200A to 200C has arcuate inner and outer surfaces 202 and 204. Formed in the inner surface 202 of each of the spring plates 200A to 200C is an arcuate groove 206 of a trapezoidal cross-section in which the outer periphery of the end flanges 22 and 24 of the couplings 10 and 12 is fitted. The spring plates 200A to 200C disposed around the end flanges 22 and 24 are connected to each other by a plurality of connecting members 208A and 208B in the form of fittings so as to form an annulus with a gap G between the end spring plates 200A and 200C. The end spring plate 200C has a pair of opposed standards 210 mounted integrally at the free end thereof and another pair of opposed standards 212 mounted integrally intermediate opposite ends thereof. The pair of standards 212 and the fitting 208A are disposed in generally diametrically opposite relation to each other, and journal shafts 214 and 216, respectively. A pair of links 218 and 220 are pivotally connected at their one ends to the shafts 214 and 216, respectively, the link 218 extending along the end spring plate 200C toward the fitting 208B while the link 220 extends along the spring plate 200B. A pair of mounting flat bars 222 and 224 are pivotally connected at their one ends to the pair of links 218 and 220 at their opposite ends, respectively, and the pair of mounting flat bars 222 and 224 are welded at their opposite ends to the rear face of the end flange 22, respectively. Thus, the plurality of the spring plates 200A to 200C connected by the fittings 208A and 208B to each other are supported by the flat bars 222 and 224 and the links 218 and 220 on the end flange 22 of the coupling 10 in such a manner that the spring plates 200A to 200C are retained in place around the end flange 22 even when the clamp assembly A is in the released condition. Provided in the gap G between the two end spring plates 200A and 200C is the coupling means B similar to that in the first embodiment. In this embodiment, the pair of opposed mounting ears 108 for supporting the hydraulic cylinder 100 are respectively secured on the pair of standards 212, and the rocker lever 104 is pivotally mounted on the pair of standards 210. The coupling rod 102 is pivotally mounted at one end thereof on a shaft 226 journalled by a fitting 228 which is mounted on the end spring plate 200A at the free end thereof.

In this embodiment, when the piston rod 114 of the hydraulic cylinder 100 is in the retracted position, as shown in FIG. 9, the coupling means B is in the closed position, and the spring plates 200A to 200C are flexed to circumscribe the end flanges 22 and 24. If an emergency arises, the hydraulic cylinder 100 is actuated, so that decoupling of the two end spring plates 200A and 200C is effected. In this condition, the spring plates 200A to 200C are restored to the original state where their radius of curvature of each of the spring plates 200A to 200C is larger than the radius of each end flange 22, 24, and the restoring force thereof facilitate the release of the spring plates 200A to 200C from the end flanges 22 and 24 even in the presence of ice formed on the coupling device and the couplings 10 and 12 of the pipes 14 and 16.

Figure 11:
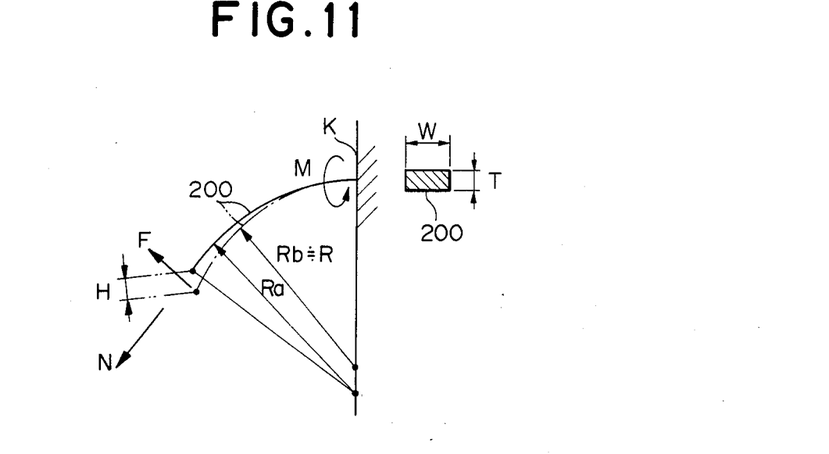
FIG. 11 is a schematic view for explaining restoring force of a spring plate of the second embodiment.
Figure 12:
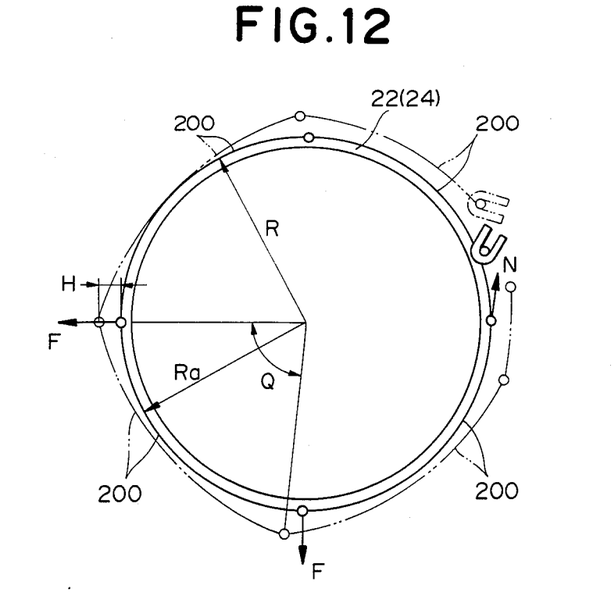
FIG. 12 is a schematic view similar to FIG. 11.

Further explanation on the restoring force of the spring plates 200A to 200C is hereinafter added with reference to FIGS. 11 and 12. Shown in FIG. 11 is an arcuate spring plate 200 having one end secured to a wall K. The spring plate 200 has a rectangular cross-section with a thickness T and a width W, and has a radius Ra. When the free end of the spring plate 200 is subjected to pulling force N, as shown in FIG. 11, the spring plate 200 is flexed by flexure amount H, so that the radius decreases from Ra to Rb. In this condition, if the free end of the spring plate 200 is released, the spring plate 200 is restored with restoring force F to its original state where the radius is Ra. And, if the radius Ra is determined so as to be almost equivalent to a radius R of each end flange 22, 24 and stress acting on the spring plate 200 due to bending moment M is in the admissible range, the pulling force N will correspond to clamping force of the spring plate 200 on the end flanges 22 and 24, and the restoring force F will serve as releasing force of the spring plate 200 from the end flanges 22 and 24. In FIG. 12, four spring plates 200 connected to each other are disposed around the end flanges 22 and 24. Where, if the width W, the thickness T, radii Ra and R, and an angle of circumference Q of the spring plate 200 are 80 mm, 20 mm, 405 mm, 400 mm and 88 degrees, respectively, the flexure amount H, the pulling force N and the restoring force F are about 1.5 mm, 620 Kgf and 180 Kgf, respectively. This amount of the restoring force F of the spring plates 200 will be enough to reliably break the ice formed thereon to release them from the end flanges 22 and 24.

Figure 13:
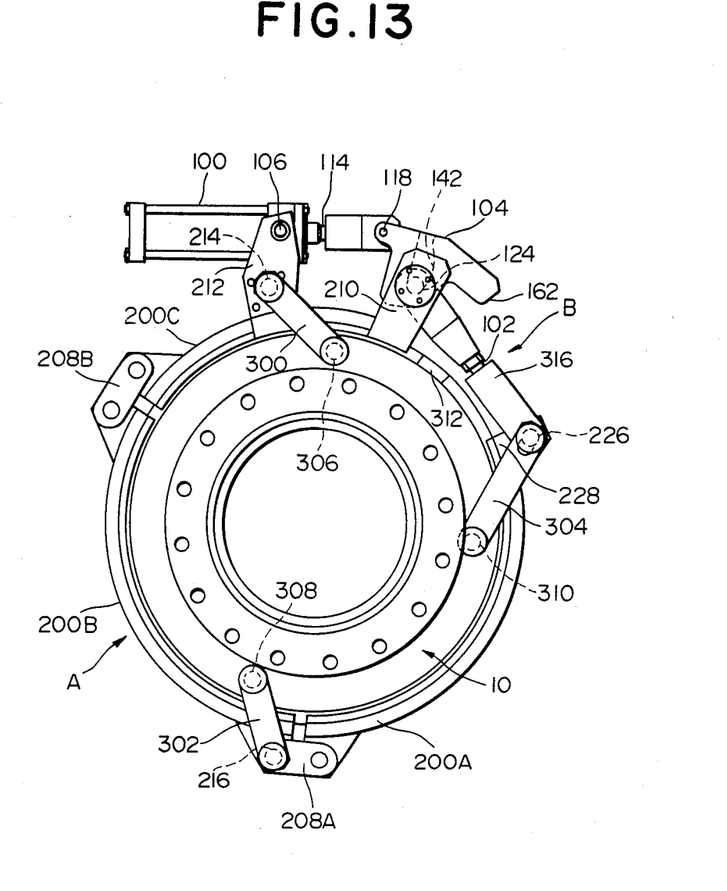
FIG. 13 is a front-elevational view showing a third embodiment of the quick release coupling device, in a closed position.
Figure 14:
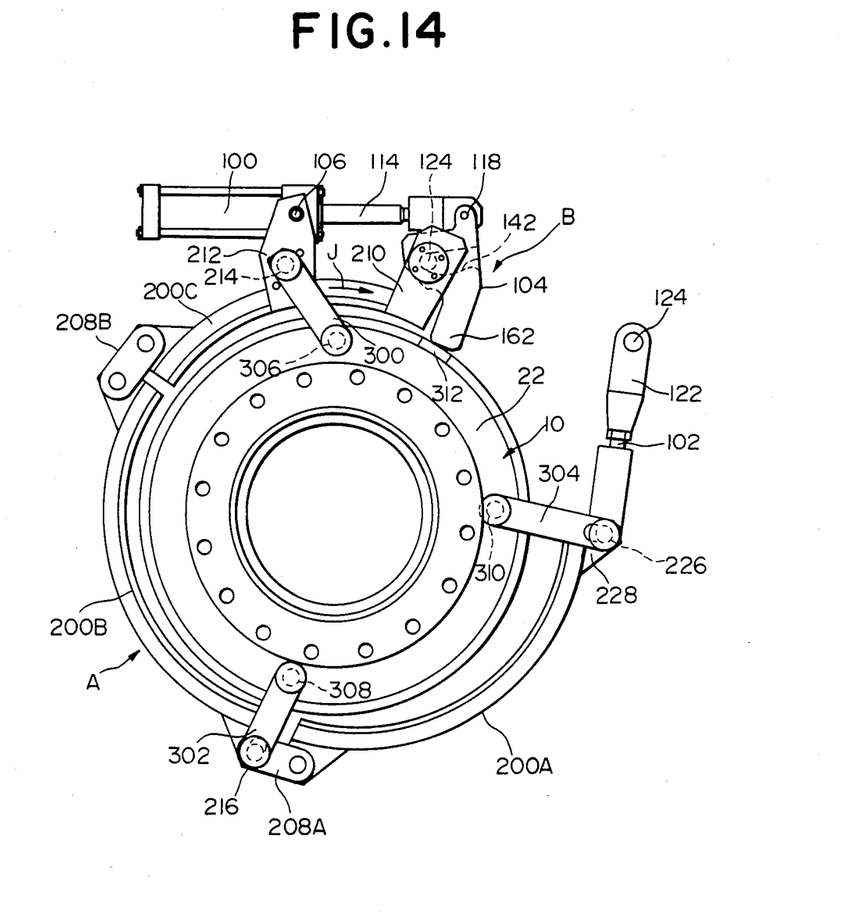
FIG. 14 is a view similar to FIG. 13, but in an open position.

FIGS. 13 to 16 show a third embodiment of the coupling device in accordance with the present invention. Since this embodiment is rather similar to the second embodiment mentioned above, only the points in which the third embodiment differs from the second embodiment will be hereinafter described. In this embodiment, first, second and third links 300, 302 and 304 are pivotally connected at their one ends to shafts 214, 216 and 226 journalled by the pair of standards 212, the fitting 208A and the fitting 228, respectively. The links 300 to 304 are pivotally connected at their opposite ends to the rear face of the end flange 22 by pivot pins 306 to 310, respectively. The links 300 to 304 are inclined with respect to the planes extending radially of the end flanges 22 and 24 in such a manner that each outer end is shifted in counterclockwise direction in FIG. 13 from each inner end in the coupled condition of the clamp assembly A. In this arrangement, the coupling and releasing operations are effected in the same way as that in the second embodiment. In the releasing operation, the abutment surfaces 162 of the rocker lever 104 are brought into abutment with the outer periphery of the end flanges 22 and 24, and the hydraulic cylinder 100 causes the rocker lever 104 to further pivot. Then, the rocker lever 104 is caused to pivot about abutting portions 312 of the outer periphery of the end flanges 22 and 24, and the clamp assembly A is rotated clockwise as indicated by an arrow J in FIG. 14, so that the links 300 to 304 also pivot about the pivot pins 306 to 310 in such a manner that the angles, defined by the links 300 to 304 and planes tangent to the circumferential surfaces 34 and 36 of the end flanges 22 and 24, approach right angles. These pivotal movement of the links 300 to 304 also facilitate the release of the spring plates 200A to 200C from the end flanges 22 and 24. In FIGS. 13 and 14, the abutting portions 312 formed on the outer periphery of the end flanges 22 and 24 have no tapered rearward surfaces. It is preferable to form notches or the like on the abutting portions 312 for preventing the sliding of the rocker lever 104 thereon.

Figure 16:
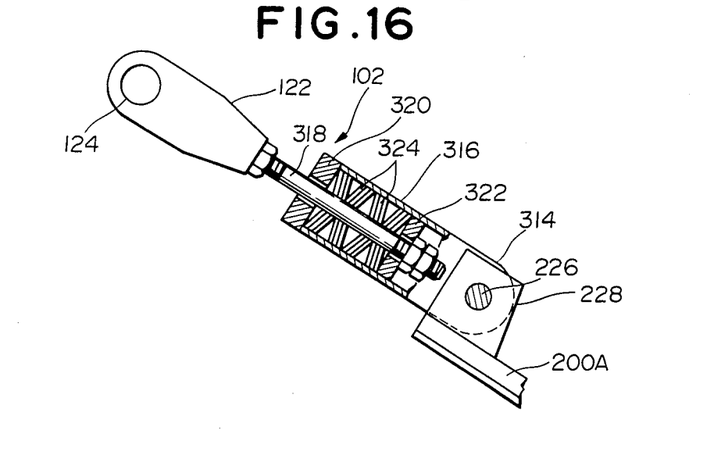
FIG. 16 is a partial cutaway enlarged view showing a coupling rod in the third embodiment.

In this embodiment, the coupling rod 102 includes a pair of apertured yokes 314 pivotally mounted on the shaft 226, a cylindrical housing 316 integrally mounted on the yokes 314 and a rod body 318 received in the housing 316 therethrough in coaxial relation thereto. The housing 316 has a bottom end 320 remote from the yokes 314 and a flange member 322 received therein for sliding therealong. The rod body 318 has exteriorly threaded opposite ends, the one end being secured to the flange member 322 by nuts, the other end being secured to the block 122 which has the engagement shaft 124. Received in the housing 316 is spring means 324 in the form of Belleville springs which act between the inner face of the bottom end 320 of the housing 316 and the flange member 322 to urge the flange member 322 toward the yokes 314. Thus, in this embodiment, the coupling rod 102 is retractable. At the beginning of the transfer of the very low temperature fluid cargo through the loading arms on which the coupling device is provided, the end flanges 22 and 24 are first suddenly cooled by the fluid flowing therethrough, and subsequently the coupling device disposed around the end flanges 22 and 24 is cooled, so that shrinkage of the spring plates 200A to 200C of the coupling device due to the cooling differs from that of the end flanges 22 and 24. Consequently, it is possible that the clamping force on the end flanges 22 and 24 by the coupling means B is weakened. However, even if such a case, inasmuch as the coupling rod 102 is retractable, the coupling force of the coupling means B is maintained high enough to secure the end flanges 22 and 24 together in sealed relation to each other.

Figure 15:
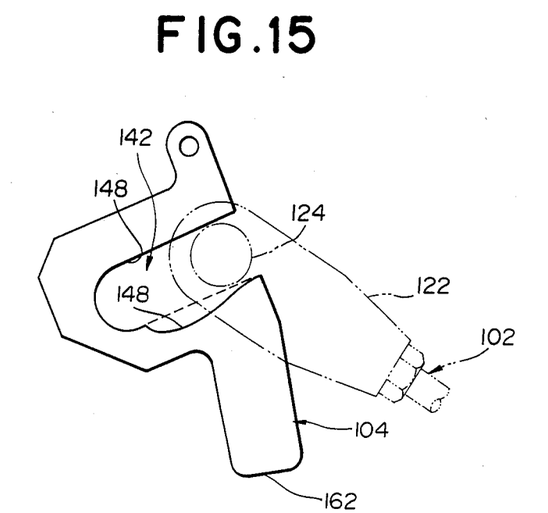
FIG. 15 is an enlarged view showing a rocker lever in the third embodiment.

Moreover in the embodiment, the engagement groove 142 of the rocker lever 104 has a pair of opposed side walls 148, the wall 148 adjacent the front end of the rocker lever 104 having an arcuate concave surface. As a result, in the coupling operation of the end spring plates 200A and 200C, since the engagement shaft 124 is received in the concave surface, the coupling rod 102 can be pulled by a relatively weak force of the hydraulic cylinder 100, thereby making it possible to employ a smaller cylinder than those in the aforementioned embodiments.

Obviously many modifications and variations of the present invention are possible in the light of the above teachings. It is therefore to be understood that within the scope of the appended claims, the invention may be practiced otherwise than as specifically described.

What is claimed is:

1. A quick release coupling device for securing end flanges of two adjacent pipes together comprising:
   a clamp assembly including
   (i) a plurality of clamping members disposed to straddle said two end flanges therearound in circumferentially distributed relation so as to generally circumscribe said two end flanges, each clamping member resiliently urged radially outwardly of said end flanges, and
   (ii) a plurality of connecting members for connecting respective adjacent pairs of clamping members together so as to form an annulus provided with a gap between first and second end clamping members; and
   (iii) coupling means disposed in said gap for releasably connecting said first and second end clamping members together against the resilient urging of said clamping members so as to complete said annulus and to hold said clamp assembly securely on said end flanges, each of said clamping members includes an arcuate spring plate which has an arcuate inner surface of radius of curvature larger than a radius of said end flanges in released condition, in which said first and second end clamping members are disconnected, and is flexed to circumscribe said end flanges in a coupled condition in which said first and second end clamping members are coupled by said coupling means, and each of said connecting members comprising a connecting fitting attached to each adjacent pair of clamping members.

2. A quick release coupling device according to claim 1, wherein said coupling means includes:
   a coupling rod pivotally mounted at one end thereof on said first end clamping member, said coupling rod having an engagement shaft mounted at the other end thereof,
   a rocker lever mounted on said second end clamping member for pivotal movement between a closed position corresponding to a coupled condition of said first and second end clamping members and an open position corresponding to a released condition thereof, said rocker lever having an engagement groove for receiving said engagement shaft which opens and extends generally radially outwardly of said end flanges in said closed position and opens and extends toward said first end clamping member in said open position, and
   drive means mounted on said second end clamping member for pivoting said rocker lever between said closed and open positions so as to introduce said engagement shaft in said groove in said closed position and to release it therefrom in said open position.

3. A quick release coupling device according to claim 2, wherein said drive means comprises a hydraulic cylinder.

4. A quick releasing coupling device according to claim 2, wherein an axis of said engagement shaft is disposed closer to said end flanges than an axis of pivotal movement of said rocker lever.

5. A quick release coupling device according to claim 2, wherein said rocker lever includes abutment means which is engageable with said end flanges in said open position so as to facilitate releasing of said clamping members from said end flanges during releasing operation.

6. A quick release coupling device according to claim 2, wherein said coupling rod includes a rod body, a housing mounted at one end of said rod body in coaxial relation thereto, and spring means received in said housing for urging said rod body to be retractable into said housing.

7. A quick release coupling device according to claim 2, wherein said groove has a pair of opposed side walls spaced generally circumferentially of said end flanges, said wall adjacent said one end clamping member having an arcuate concave surface so that said engagement shaft is engaged with said concave surface to be retained in said groove during coupling operation in which said rocker lever is pivoted to pull said coupling rod toward said other clamping member.

8. A quick release coupling device according to claim 1, wherein said coupling means includes a coupling rod pivotally mounted at one end thereof on said one end clamping member, said coupling rod having an engagement shaft mounted at the other end thereof, a rocker lever mounted on said other end clamping member for pivotal movement between a closed position corresponding to a coupled condition of said two end clamping members and an open position corresponding to a released condition thereof, said rocker lever having an engagement groove for receiving said engagement shaft which opens and extends generally radially outwardly of said end flanges in said closed position and opens and extends toward said one end clamping member in said open position, said rocker lever having abutment means which is engageable with said end flanges in said open position so as to facilitate releasing of said clamping members from said end flanges during releasing operation, and drive means mounted on said other end clamping member for pivoting said rocker lever between said closed and open positions so as to introduce said engagement shaft in said groove in said closed position and to release it therefrom in said open position, and said clamping assembly including a plurality of links having on e ends pivotally connected to said clamp assembly and the opposite ends pivotally connected to one of said end flanges, said links being disposed in such a manner that said links are inclined with respect to planes extending radially of said end flanges in said closed position and said links are pivoted so that angles defined by said links and planes tangent to the outer periphery of said end flanges approach right angles during releasing operation.

9. A quick release coupling device according to claim 2, wherein the rocker lever includes an upper arm portion, said upper arm portion engaging said end flanges as the rocker lever pivots to the open position to help force the second end coupling member away from the end flanges.

10. A quick release coupling device according to claim 2, wherein:
the coupling means further includes a set pin connected to the rocker lever for movement between first and second positions;
in the first position, the set pin prevents movement of the engagement shaft out of the engagement groove; and
in the second position, the set pin allows the engagement shaft to move into and out of the engagement groove.

11. A quick release coupling device according to claim 2, wherein the coupling means further includes means releasably connecting the rocker lever to the second end clamping member to hold the rocker lever in the closed position and to inhibit the rocker lever from inadvertently moving from the closed position to the open position.

12. A quick release coupling device according to claim 11, wherein:
the means releasably connecting the rocker lever to the second end clamping member includes a shear pin, said shear pin breaking as the drive means pivots the rocker lever from the closed position to the open position.

* * * * *

UNITED STATES PATENT AND TRADEMARK OFFICE
CERTIFICATE OF CORRECTION

PATENT NO. : 4,730,850

DATED : March 15, 1988

INVENTOR(S) : Susumu Takahashi

It is certified that error appears in the above-identified patent and that said Letters Patent is hereby corrected as shown below:

Column 10, line 26, Claim 1: "resiliently" should read as --being resiliently--

Column 12, line 7, Claim 8: "on e" should read as --one--

Signed and Sealed this

Twenty-seventh Day of December, 1988

Attest:

DONALD J. QUIGG

*Attesting Officer*    *Commissioner of Patents and Trademarks*